US012631297B2

(12) United States Patent
(10) Patent No.: US 12,631,297 B2
(45) Date of Patent: *May 19, 2026

Aguiar et al.

(54) HANDLE FOR A PORTABLE CYLINDER

(71) Applicant: AMTROL LICENSING INC., West Warwick, RI (US)

(72) Inventors: Carlos Aguiar, Oporto (PT); Pedro Alexandre Queiros Oliveira Silva Vieira, Matosinhos (PT); Tiago Teixeira Rego De Oliveira, Oporto (PT)

(73) Assignee: AMTROL LICENSING INC., West Warwick, RI (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/901,514

(22) Filed: Sep. 30, 2024

(65) Prior Publication Data

US 2025/0020286 A1 Jan. 16, 2025

Related U.S. Application Data

(63) Continuation of application No. 18/170,691, filed on Feb. 17, 2023, now Pat. No. 12,129,970.

(51) Int. Cl.
*F17C 13/08* (2006.01)

(52) U.S. Cl.
CPC .... *F17C 13/084* (2013.01); *F17C 2201/0109* (2013.01); *F17C 2201/058* (2013.01); *F17C 2205/0165* (2013.01)

(58) Field of Classification Search
CPC ...... F17C 2205/0165; F17C 2205/0308; F17C 2205/0323; F17C 2209/00; F17C 2270/07
See application file for complete search history.

(56) References Cited

U.S. PATENT DOCUMENTS 9,932,148 B2 * 4/2018 Chohfi ...................... F17C 1/00
D930,109 S * 9/2021 Aguiar ......................... D23/206
(Continued)

FOREIGN PATENT DOCUMENTS

EP 3048358 A1 7/2016

OTHER PUBLICATIONS

PCT/US2023/084775; International Preliminary Report on Patentability and Written Opinion of the International Searching Authority; Mailed Aug. 15, 2025; 7 pages.

*Primary Examiner* — Don M Anderson
(74) *Attorney, Agent, or Firm* — Tucker Ellis LLP

(57) ABSTRACT

Provided is a portable cylinder including a tank having a mounting collar coupled to an upper portion of the tank, and a handle assembly attached to the mounting collar. The mounting collar has an upwardly extending portion and a plurality of circumferentially spaced tabs extending radially outwardly from the upwardly extending portion, wherein a respective gap is formed between adjacent ones of the plurality of circumferentially spaced tabs. The handle assembly includes a handle having a shroud portion and a handle portion extending from the shroud portion, and an attachment member configured to be coupled to the shroud portion to prevent rotational movement of the handle relative to the collar, the attachment member having a body, a first projection projecting from a front wall of the body for engaging the shroud portion, and a second projection projecting from a back wall of the body for engaging the shroud portion.

19 Claims, 18 Drawing Sheets

(56) References Cited

U.S. PATENT DOCUMENTS

| | | | | |
|---|---|---|---|---|
| 11,585,491 | B2 * | 2/2023 | Aguiar | F17C 13/084 |
| 2012/0248128 | A1 * | 10/2012 | Chohfi | B65D 25/22<br>220/769 |
| 2016/0215928 | A1 * | 7/2016 | Chohfi | B65D 25/28 |
| 2019/0353305 | A1 * | 11/2019 | Aguiar | F17C 13/084 |
| 2021/0062975 | A1 * | 3/2021 | de Oliveira | F17C 13/084 |
| 2022/0042653 | A1 * | 2/2022 | Aguiar | F17C 13/06 |

* cited by examiner

HANDLE FOR A PORTABLE CYLINDER

RELATED APPLICATION

This application is a continuation of U.S. patent application Ser. No. 18/170,691 filed Feb. 17, 2023.

TECHNICAL FIELD

In general, the present invention relates to a portable cylinder, and in particular to a handle for a portable cylinder.

BACKGROUND OF THE INVENTION

A variety of pressurized gas cylinders have been used for storage and transportation of pressurized gas products for household and industrial. For example, the cylinders may be used for the storage of gas for cooking appliances such as stoves or grills, for the storage of refrigerant, for the storage of helium, etc. Many of these cylinders have traditionally been fabricated of steel with a steel cylindrical body having a valve at the top for controlling the flow of gas from the cylinder, a footing at the bottom to provide stability for the cylinder upon a supporting surface, and a handle at the top to assist in transporting the cylinder and for protecting the valve.

SUMMARY OF THE INVENTION

In accordance with an embodiment of the present invention, a handle assembly for a cylinder is provided. The handle assembly includes a handle having a shroud portion configured to couple to a collar of the cylinder, the shroud portion including a plurality of circumferentially spaced ledges for abutting an underside of a respective one of a plurality of circumferentially spaced tabs of the collar to prevent upward movement of the shroud portion relative to the collar, and a handle portion extending from the shroud portion and having one or more areas for grasping the handle, and an attachment member configured to be coupled to the shroud portion to prevent rotational movement of the handle relative to the collar, the attachment member having a body, a first projection projecting from a front wall of the body for engaging the shroud portion, and a second projection projecting from a back wall of the body for engaging the shroud portion.

In accordance with another embodiment of the present invention, a portable cylinder is provided. The portable cylinder includes a tank having an upper portion having a valve port, a mounting collar coupled to the upper portion of the tank, the mounting collar having an upwardly extending portion surrounding the valve port and a plurality of circumferentially spaced tabs extending radially outwardly from the upwardly extending portion, wherein a respective gap is formed between adjacent ones of the plurality of circumferentially spaced tabs, and a handle assembly attached to the mounting collar. The handle assembly includes a handle having a shroud portion coupled to the collar, the shroud portion including a plurality of circumferentially spaced ledges that abut an underside of a respective one of the plurality of circumferentially spaced tabs in an attachment position to prevent upward movement of the shroud portion relative to the collar, and a handle portion extending from the shroud portion and having one or more areas for grasping the handle, and an attachment member coupled to the shroud portion in the attachment position to prevent rotational movement of the handle relative to collar, the attachment member having a body, a first projection projecting from a front wall of the body for engaging the shroud portion, and a second projection projecting from a back wall of the body for engaging the shroud portion.

In accordance with another embodiment of the present invention, a method of assembling a portable cylinder is provided. The cylinder a tank having an upper portion, a collar attached to the tank at the upper portion, and a handle. The method includes lowering the handle onto the collar to cause a plurality of circumferentially spaced ledges of the handle to be received in gaps between adjacent ones of a plurality of circumferentially spaced tabs on the collar, rotating the handle until each of the plurality of circumferentially spaced ledges are positioned below a respective one of the plurality of circumferentially spaced tabs, and advancing an attachment member downward through an opening in the handle such that projections on the attachment member engage projections projecting from the opening to couple the handle to the tank.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
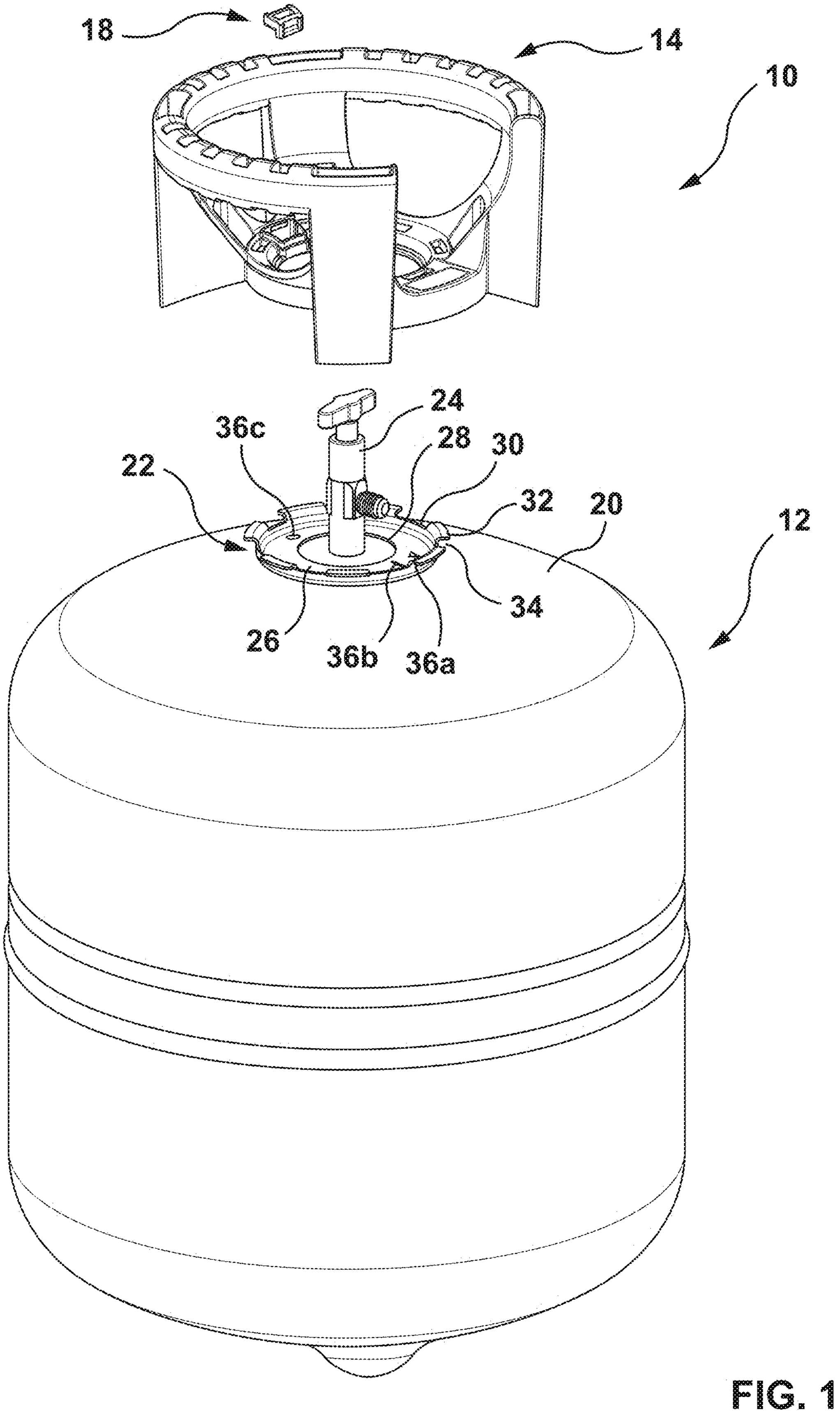
FIG. 1 is an exploded front perspective view of an exemplary cylinder.
Figure 2:
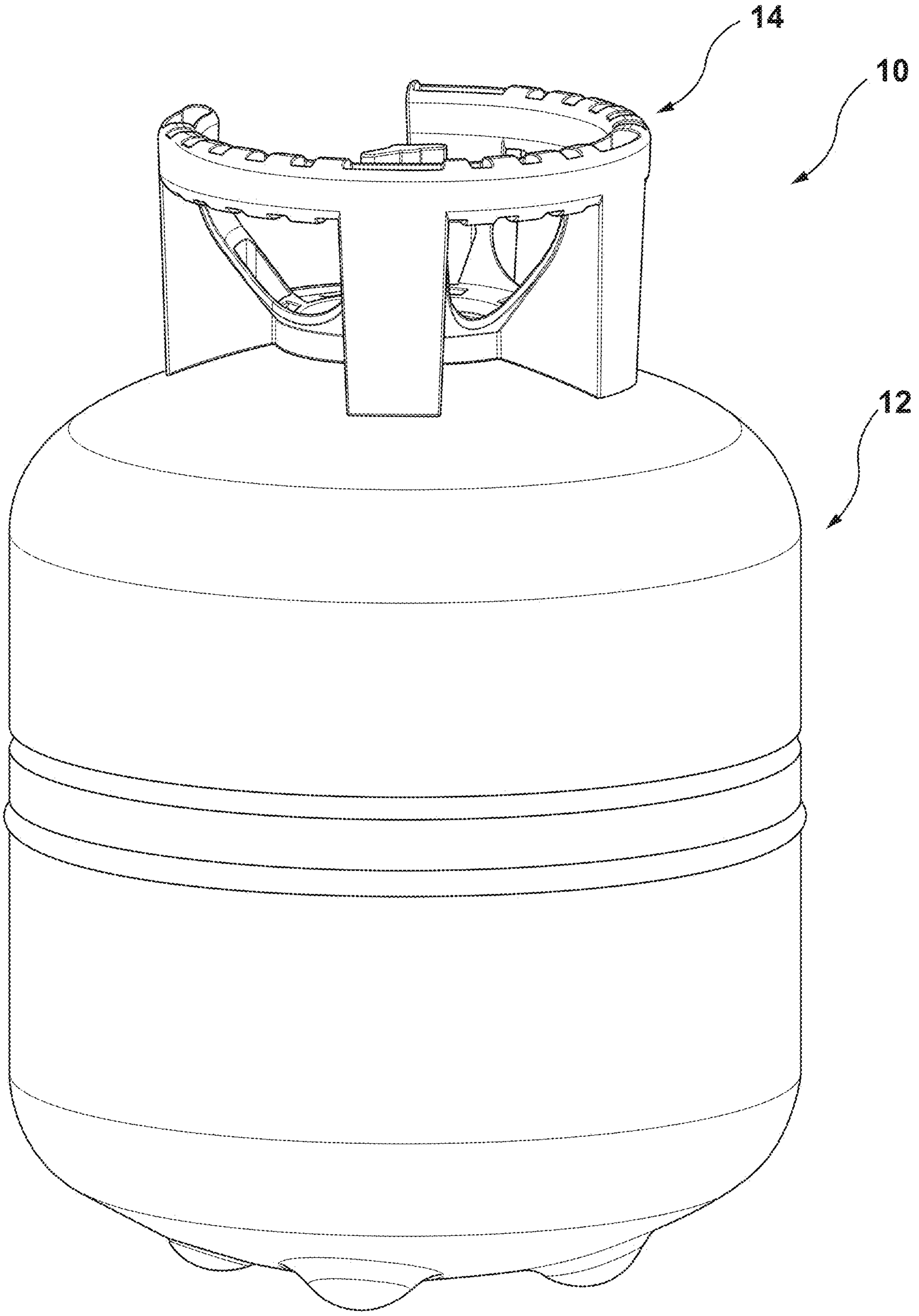
FIG. 2 is a rear perspective view of the cylinder.
Figure 3:
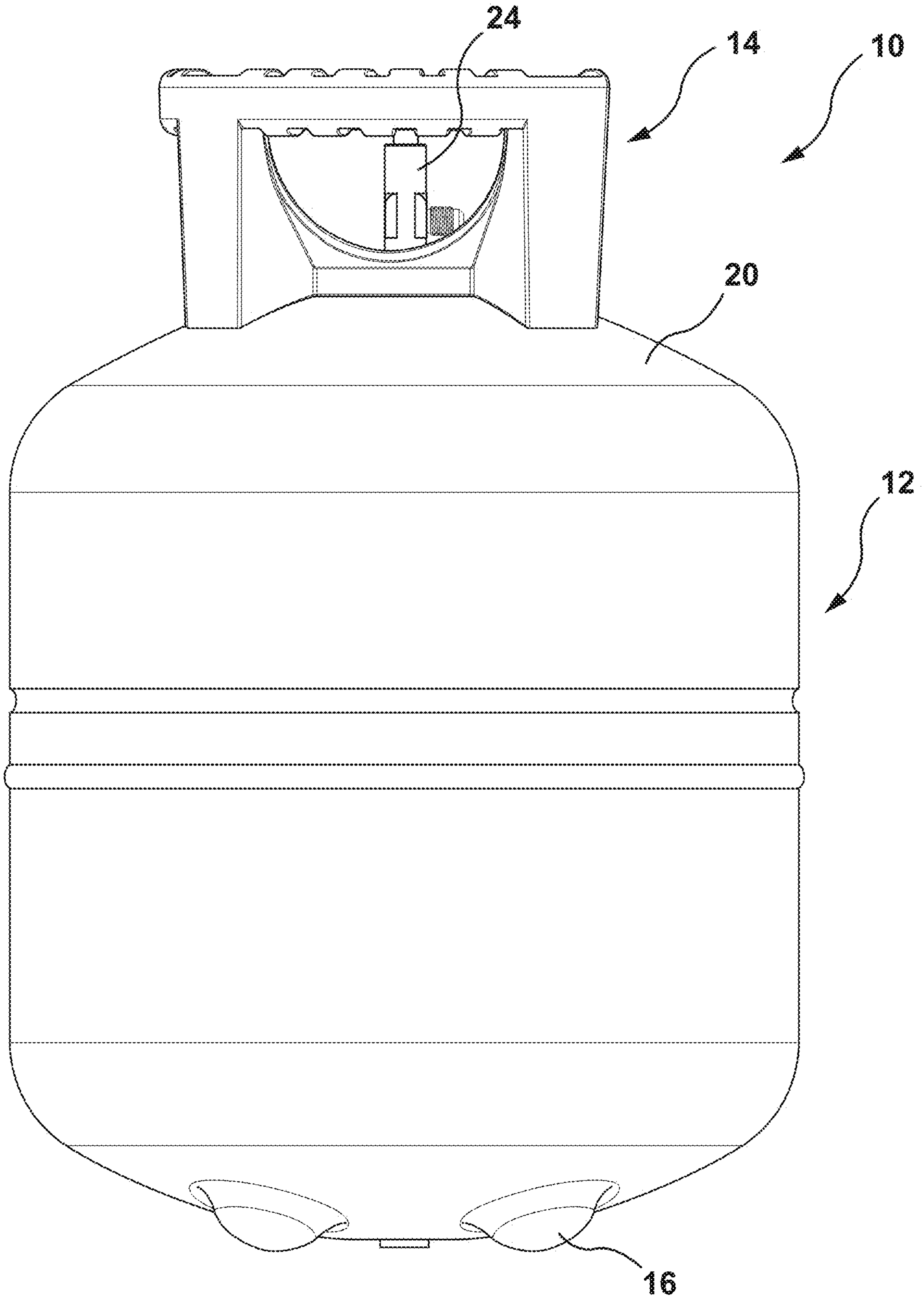
FIG. 3 is a left side view of the cylinder.
Figure 4:
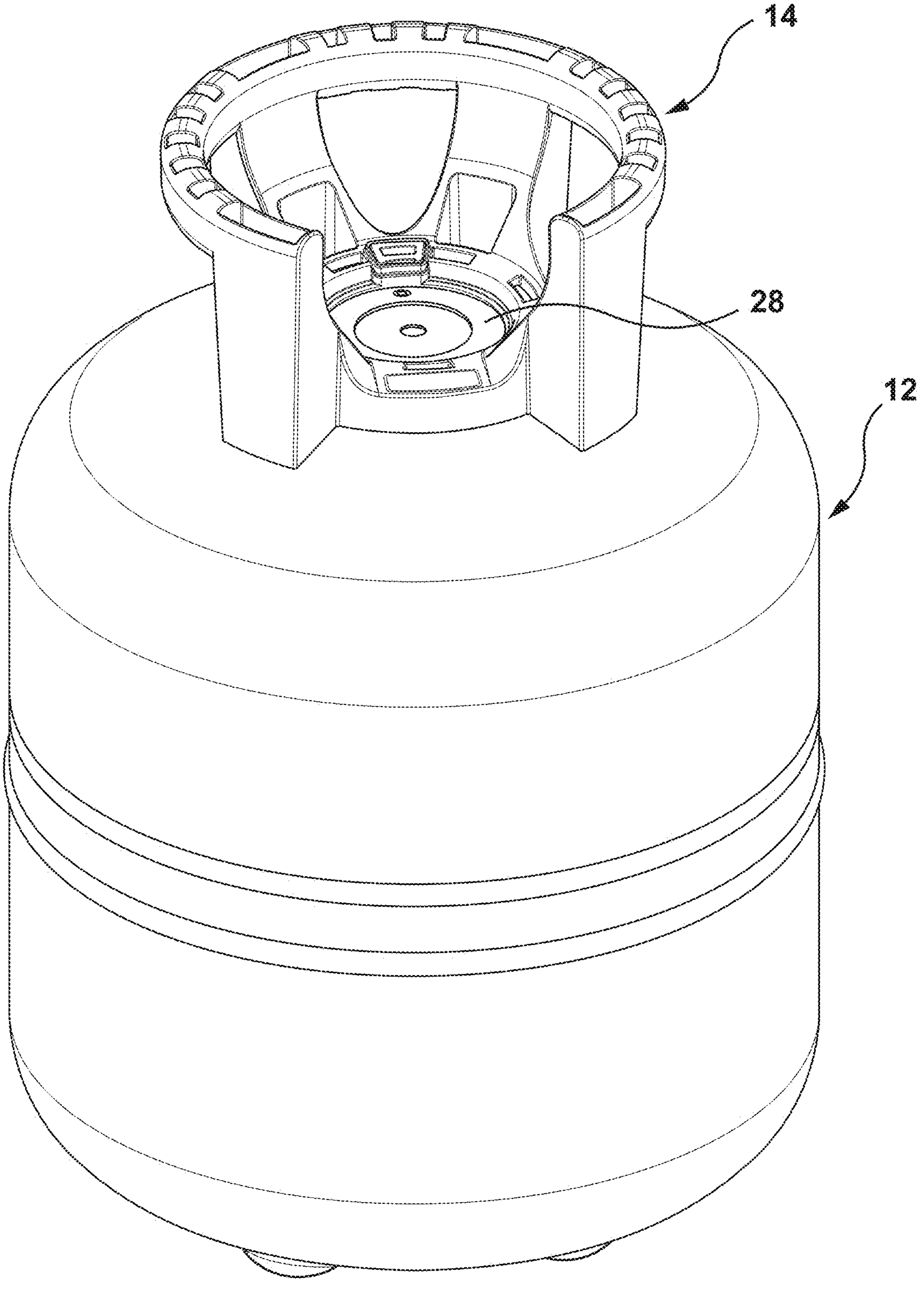
FIG. 4 is a front perspective view of the cylinder without a valve.
Figure 5:
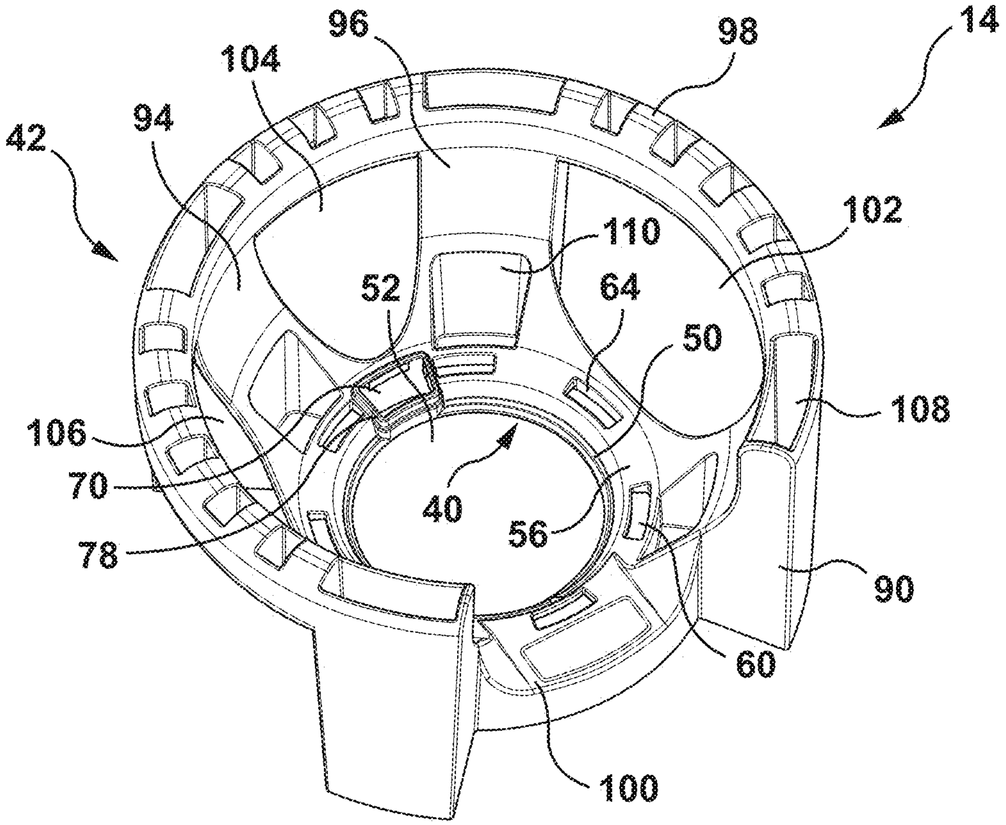
FIG. 5 is a top front perspective view of an exemplary handle.
Figure 6:
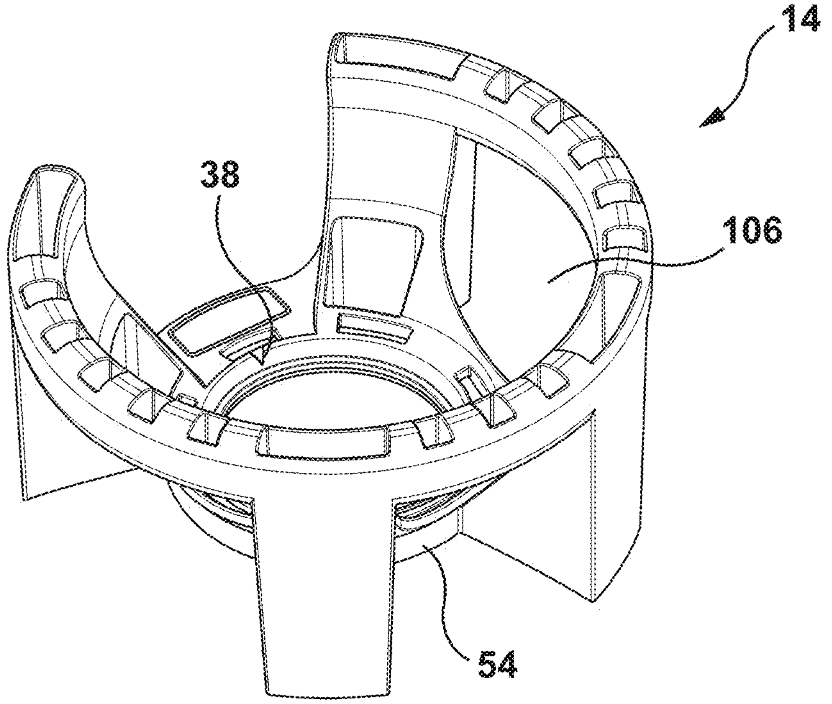
FIG. 6 is a top rear perspective view of the handle.

Embodiments of the invention relate to methods and systems that relate to a portable cylinder. The cylinder has a tank having an upper portion having a valve port, a mounting collar coupled to the upper portion of the tank, and a handle assembly attached to the mounting collar. The mounting collar has an upwardly extending portion surrounding the valve port and a plurality of circumferentially spaced tabs extending radially outwardly from the upwardly extending portion, wherein a respective gap is formed between adjacent ones of the plurality of circumferentially spaced tabs. The handle assembly includes a handle having a shroud portion configured to couple to a collar of the cylinder, the shroud portion including a plurality of circumferentially spaced ledges for abutting an underside of a respective one of a plurality of circumferentially spaced tabs of the collar to prevent upward movement of the shroud portion relative to the collar, and a handle portion extending from the shroud portion and having one or more areas for grasping the handle, and an attachment member configured to be coupled to the shroud portion to prevent rotational movement of the handle relative to the collar, the attachment member having a body, a first projection projecting from a front wall of the body for engaging the shroud portion, and a second projection projecting from a back wall of the body for engaging the shroud portion.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-4, a portable cylinder is shown generally at reference numeral 10. The cylinder 10 includes a tank 12 configured to store a suitable pressurized fluid, a handle 14 attached to a top of the tank 12, one or more feet 16 at a bottom of the tank 12, and an attachment member 18 that secures the handle 14 to the tank 12. In an embodiment, a suitable foot assembly may be attached to the bottom of the tank 12 in place of or in addition to the feet 16.

The handle 14 and/or tank 12 can have a color that is chosen to reflect the different materials of the handle 14 and/or tank 12 and/or the different fluids stored in the tank 12. For example, the tank 12 and/or handle 14 may be a first color to indicate that helium is stored in the tank 12, a second color to indicate that a first type of refrigerant is stored in the tank 12, a third color to indicate that a second type of refrigerant is stored in the tank 12, etc. The tank 12 may be made of a suitable material, such as a suitable metal, such as steel, and in an embodiment the tank may be non-refillable and thus disposable.

The tank 12 includes an upper portion 20 having a valve port for receiving a suitable valve 24, and a mounting collar 22 is provided surrounding the valve port. The mounting collar 22 may be secured to the upper portion 20 in any suitable manner, such as by a suitable welding process, such as spot welding, arc welding, etc., or may alternatively be integrally formed with the upper portion 20. In an embodiment, the mounting collar 22 is positioned on the upper portion 20, the valve 24 is positioned in the valve port, and then the mounting collar 22 and the valve 24 are secured to the upper portion 20 at the same time in one welding process. In another embodiment, the mounting collar 22 is positioned on the upper portion 20 and secured thereto in a first welding process, and the valve 24 is positioned in the valve port and secured thereto in a second welding process. The mounting collar 22 may be made of a suitable material, such as metal, such as a steel of a grade to allow for welding, corrosion resistance, and to absorb tension on the cylinder without significant deformation.

The mounting collar 22 has a base 26, which is shown as substantially circular, attached to the upper portion 20 and includes an opening 28 surrounding the valve port, an upwardly extending portion 30 extending around a perimeter of the base 26, and a plurality of circumferentially spaced tabs 32 extending radially outwardly from the upwardly extending portion 30. A respective gap 34 is formed between adjacent ones of the plurality of circumferentially spaced tabs 32. In the illustrated embodiment, the mounting collar 22 includes seven circumferentially spaced tabs 32 spaced from one another, although it we be appreciated that any suitable number of tabs may be provided at a suitable spacing from one another.

Figure 13:
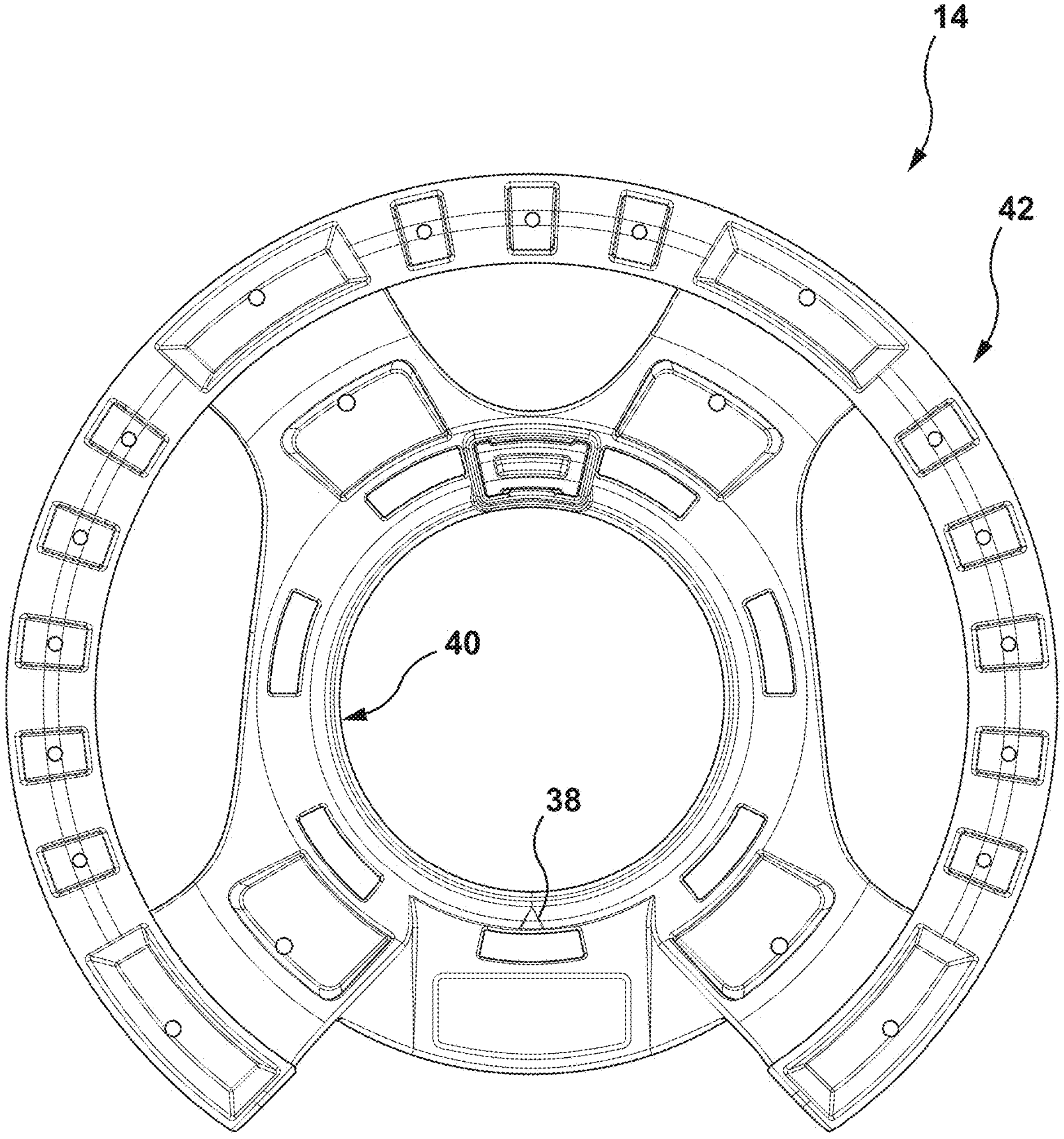
FIG. 13 is a top view of the handle.
Figure 14:
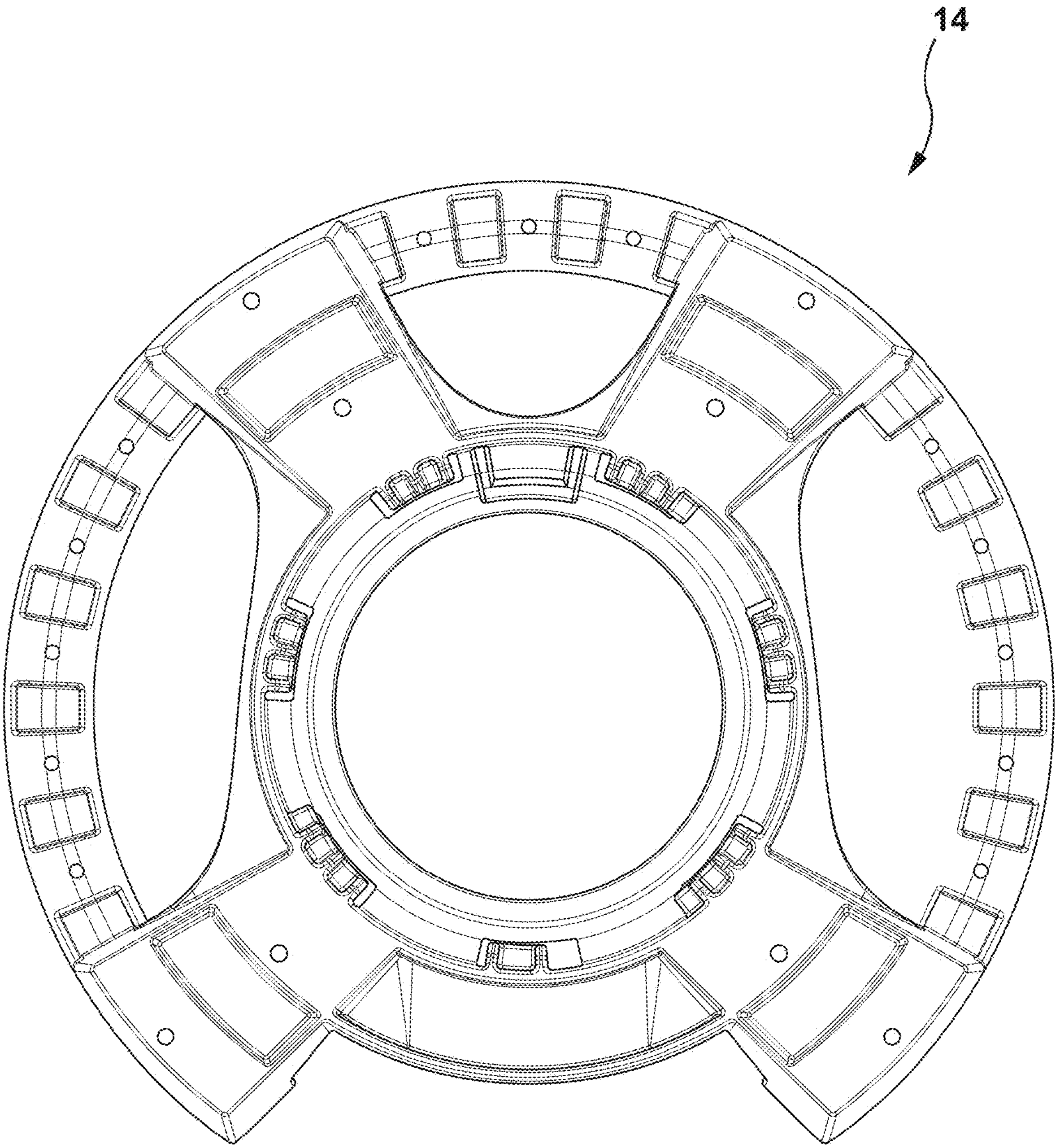
FIG. 14 is a bottom view of the handle.

The base 26 may include indicia on its upper surface, such as indicia 36*a*, 36*b*, and 36*c*. The indicia 36*a*-36*c* may be suitable indicia used for attaching the handle 14 to the tank 12. For example, the indicia 36*a* may be in the form of a triangle or other suitable indicia for aligning with a corresponding triangle 38 (see FIG. 13) or other suitable indicia on the handle 14 to indicate a first position of the handle during installation, the indicia 36*b* can be line or other suitable indicia to indicate a second position of the handle during installation, and the indicia 36*c* can be a circle or other suitable indicia to indicate a position where the attachment member 18 is to be installed to secure the handle 14 to the tank 12 during installation. It will be appreciated that the indicia may be in the form of intends or protrusions, stickers, markings, etc.

Referring additionally to FIGS. 5-14, the handle 14 will be discussed in detail. The handle 14 includes a shroud portion 40 that attaches to the mounting collar 22 as will be described below in detail and a handle portion 42 projecting from the shroud portion 40. The handle 14 has the rigidity to maintain ergonomic integrity while having the flexibility to absorb energy, and may be made of a suitable material, such as a polymeric material that is compressible to absorb shocks during drops or impacts.

The shroud portion 40 includes an inner body portion 50 with an opening 52 or through passage extending therethrough to surround the valve 24, an outer body portion 54 radially outwardly spaced from the inner body portion 50, and a base 56 extending therebetween. A channel 46 is defined between the inner and outer body portions 50 and 54 and the base 56 for receiving the mounting collar 22 such that a radially outer surface of the inner body portion 50 will abut or be in close proximity to the upwardly extending portion 30 and a radially inner surface of the outer body portion 54 will abut or be in close proximity to an outer edge of the circumferentially spaced tabs 32. The inner and outer body portions 50 and 54 may be circular or substantially circular to correspond to the geometry of the mounting collar 22.

The shroud portion 40 also includes a plurality of circumferentially spaced ledges 58 extending radially inwardly from the outer body portion 54 in the channel 46. In the illustrated embodiment, the shroud portion 40 includes seven ledges 58 spaced from one another, one ledge 58 corresponding to each of the plurality of circumferentially spaced tabs 32, although it will be appreciated that any suitable number of ledges 58 with suitable spacing may be provided. The ledges 58 are each spaced from the base 56 in a first direction to define areas for receiving a respective one of the plurality of circumferentially spaced tabs 32 of the mounting collar 22, and each ledge 58 is spaced from the inner body portion 50 in a respective second direction orthogonal the first direction to define an area for receiving the upwardly extending portion 30 of the mounting collar 22. Each ledge 58 can include a planar portion 60 and a plurality of circumferentially spaced ribs 62 below the planar portion 60 for providing support to the planar portion 60 while minimizing weight and material usage. At least one of the ledges 58, and as shown three of the ledges 58, may also include a blocking portion 66 that projects substantially perpendicular to the planar portion 60 on one side thereof to abut the base 58 to provide a stop for preventing rotation of the handle 14 relative to the mounting collar 22 in one direction when contacting one of the tabs 32. A plurality of circumferentially spaced openings 64 are provided in the base 56 at a location where each opening 64 corresponds to one of the plurality of circumferentially spaced ledges 58. As illustrated, each opening 64 is larger than the respective ledge 58 on at least one side of the ledge.

Figure 15:
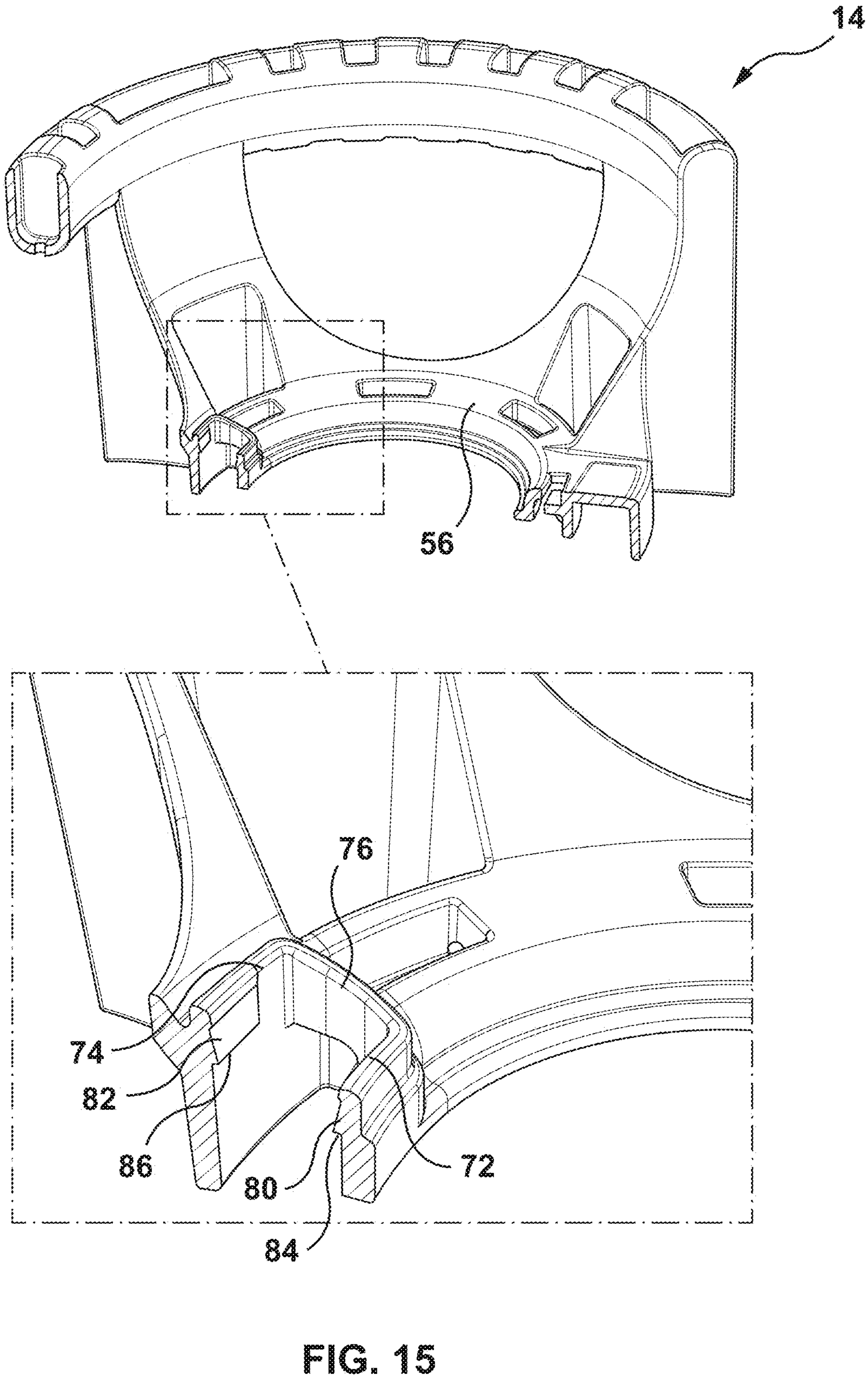
FIG. 15 is a cross-sectional view of the handle.
Figure 16:
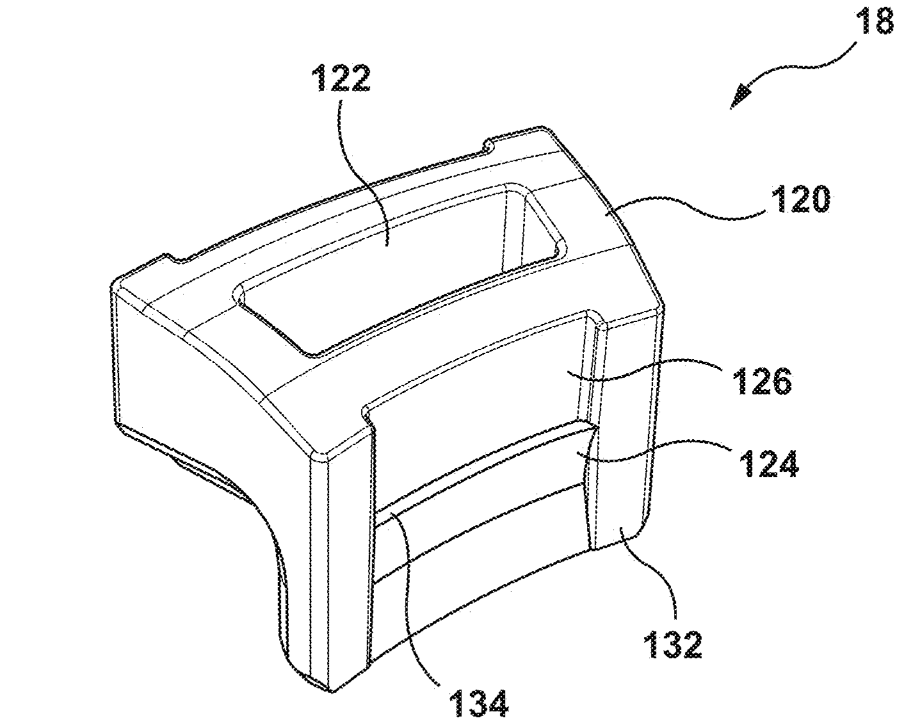
FIG. 16 is a perspective view of an exemplary attachment member.
Figure 17:
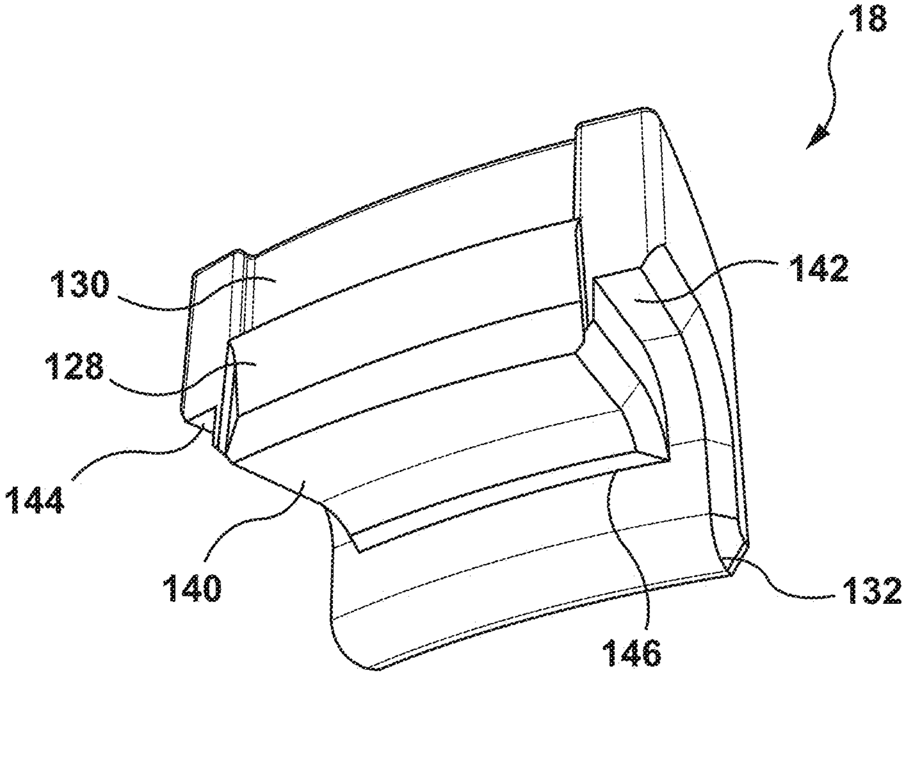
FIG. 17 is another perspective view of the attachment member.
Figure 18:
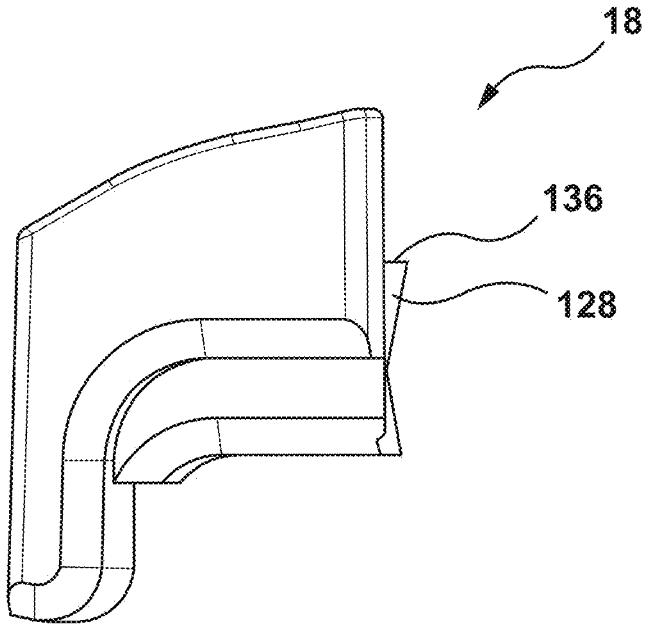
FIG. 18 is a side view of the attachment member.
Figure 19:
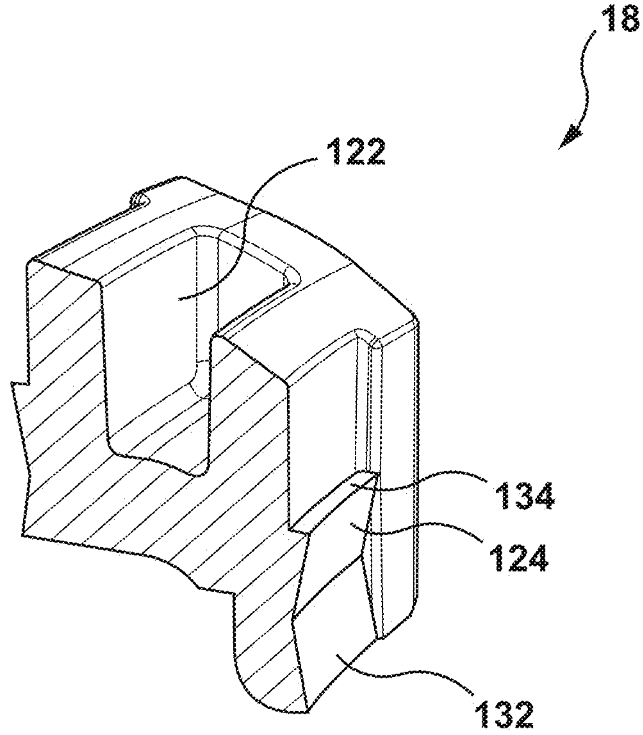
FIG. 19 is a cross-sectional view of the attachment member.

Turning additionally to FIG. 15, the shroud portion 40 also includes an opening 70 at a rear of the handle 14 between a pair of openings 64. The opening 70 has a front wall 72 with a circumferential width that is less than a circumferential width of a back wall 74 and a pair of sides 76 and 78 angled relative to the front and back walls 72 and 74. The front wall 72 of the opening may form part of the inner body portion 52 and the back wall 74 of the opening may form part of the outer body portion 54. Projecting inward from the front and back walls 72 and 74 towards one another are respective projections 80 and 82 having respective engagement surfaces 84 and 86. The projections 80 and 82 are angled downward such that the engagement surfaces 84 and 86 face away from the base 56. The projection 80 on the front wall 72 is at a height that is below the projection 82 on the back wall 74.

Figure 7:
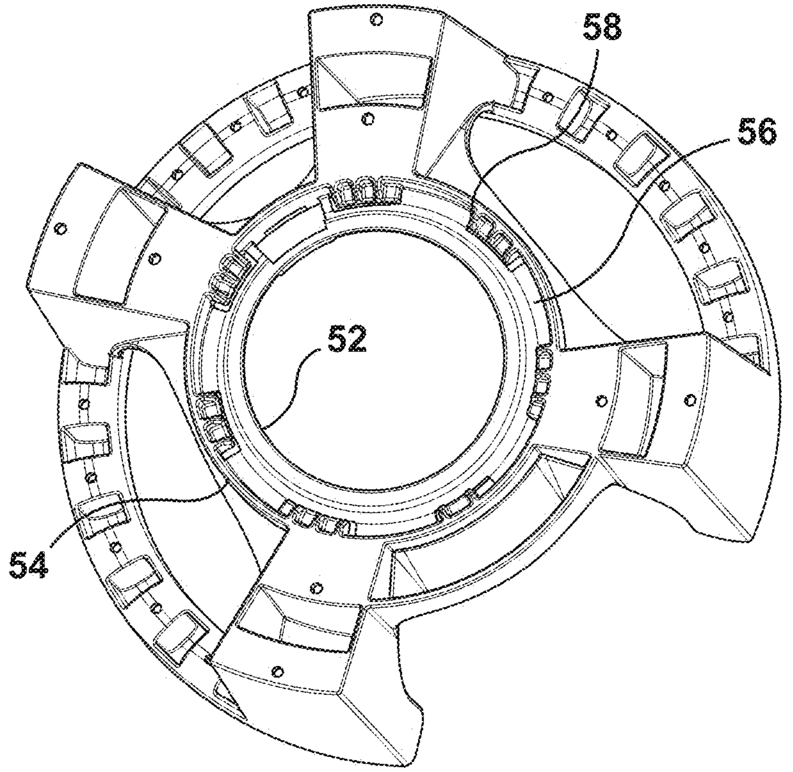
FIG. 7 is a bottom front perspective view of the handle.
Figure 8:
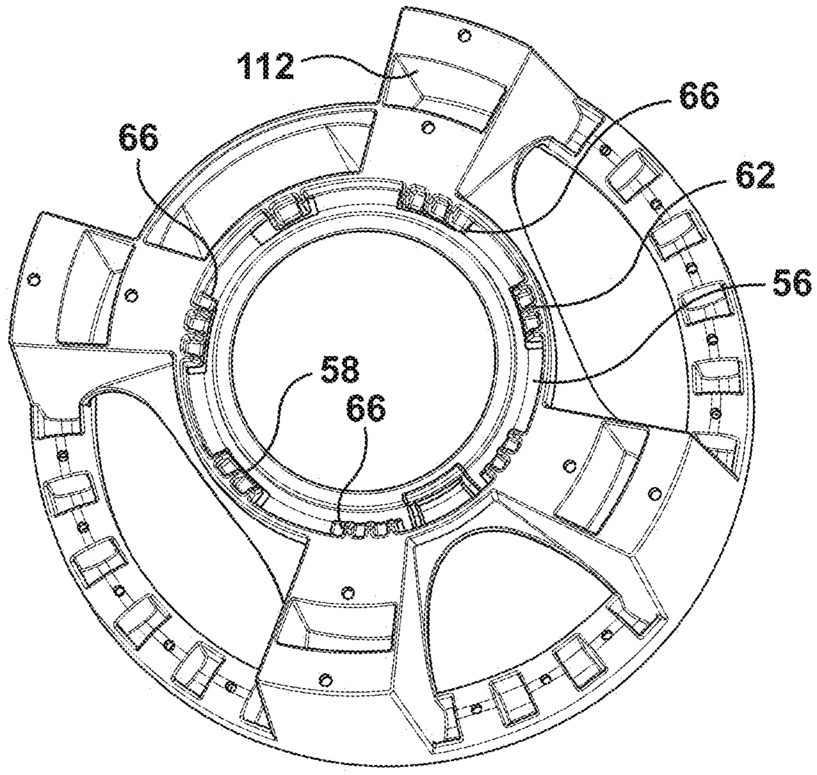
FIG. 8 is a bottom rear perspective view of the handle.
Figure 9:
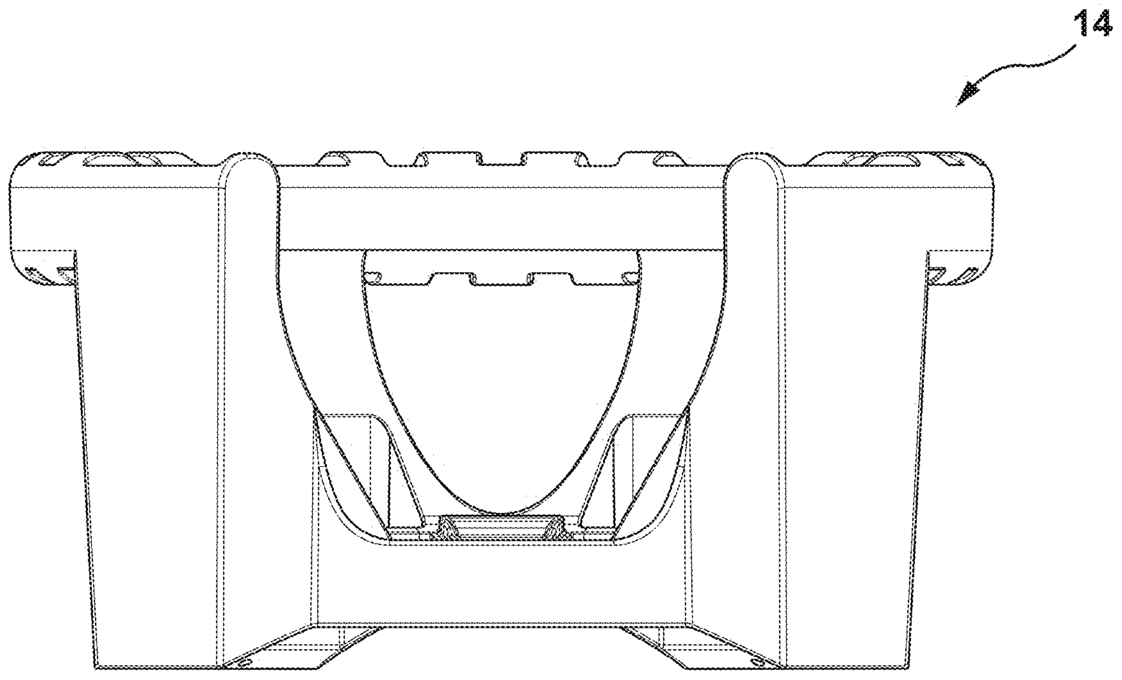
FIG. 9 is a front view of the handle.
Figure 10:
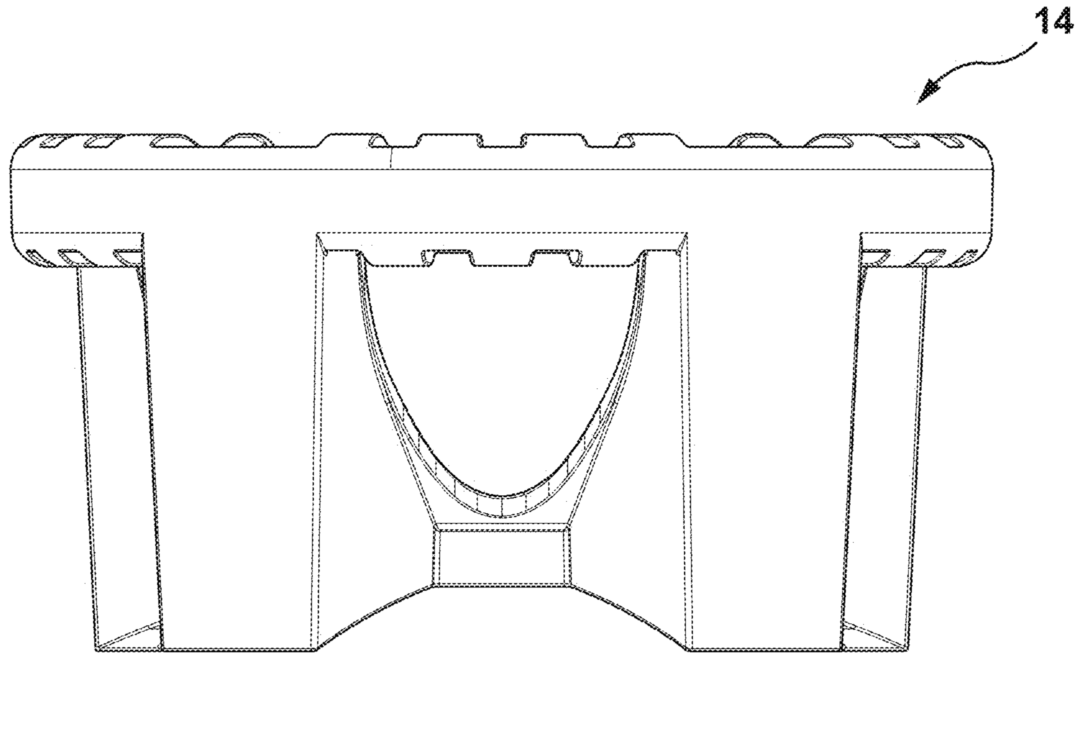
FIG. 10 is a rear view of the handle.
Figure 11:
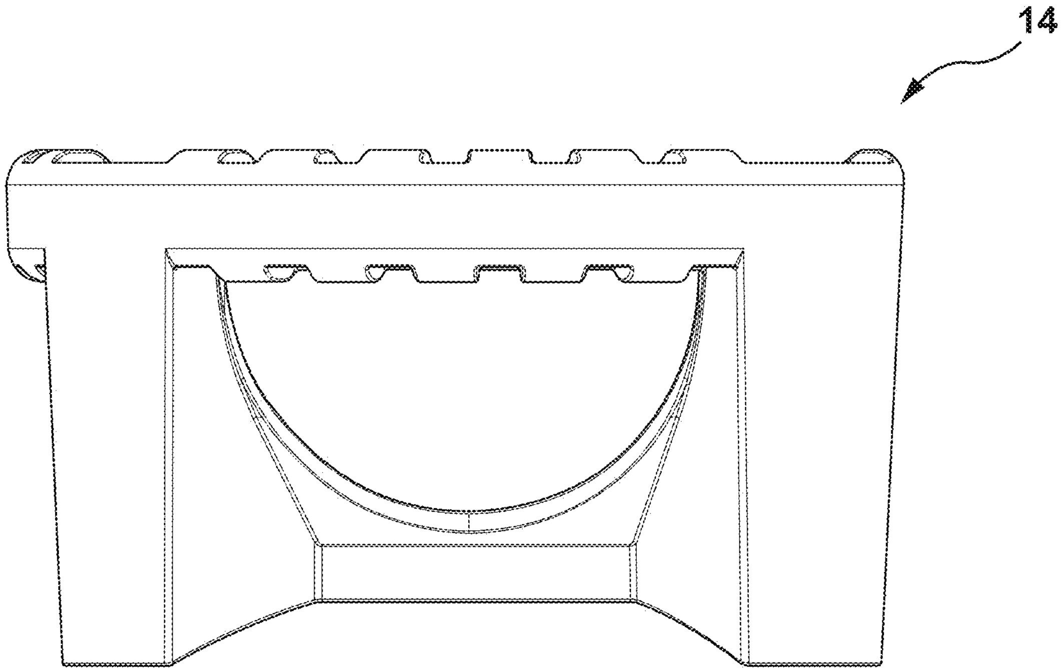
FIG. 11 is a left side view of the handle.
Figure 12:
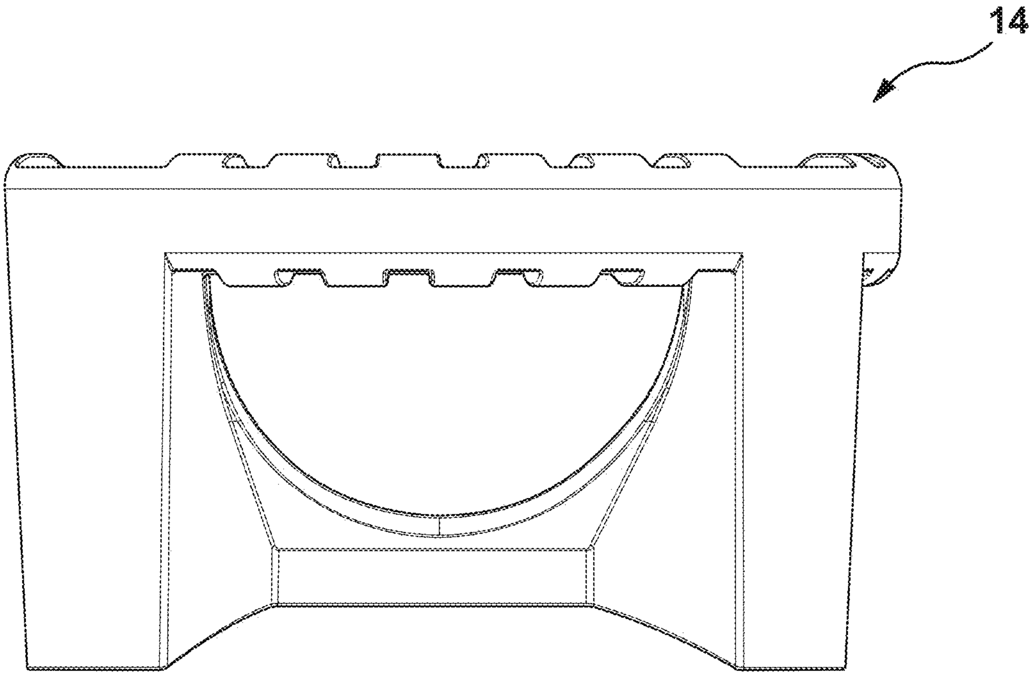
FIG. 12 is a right side view of the handle.

Referring now to the handle portion 42 in detail and FIGS. 5-14, the handle portion 42 has a plurality of circumferentially spaced pillars 90, 92, 94, and 96 extending from the shroud portion 40 and a curved handle 98 extending above the pillars 90, 92, 94, and 96. The pillars 90 and 92 and ends of the curved handle 98 are circumferentially spaced from one another to define a gap through which a nozzle attached to the valve 24 extends, and a support 100 is provided between the pillars 90 and 92. A top of the curved handle 98 is flat or substantially flat to serve as a foot if the tank 12 is positioned upside down as shown in FIGS. 7 and 8, and has a circumference sized to keep the tank 12 stable when the tank is being supported on the curved body 90. Bottoms of the pillars 90, 92, 94, and 96 are configured to abut the upper portion 20 of the tank to transfer force from the handle 14 to the tank, for example if the tank is dropped on the handle 14. The handle portion 42 also includes a plurality of openings 102, 104, and 106 formed between the pillars 90, 92, 94, and 96, curved handle 98, and shroud portion 40 for material and weight savings and to define grip areas for a user or machine to grasp the handle member 42 to transport the cylinder 10, and the pillars 90, 92, 94, and 96 each include a plurality of cavities 108, 110, 112 for material and weight savings.

Turning now to FIGS. 16-19 and the attachment member 18 in detail, the attachment member 18 may be made of a suitable material, such as a polymeric material, which may be the same as or different from the polymeric material of the handle 14. The attachment member 18 includes a body 120 having a cavity 122, a projection 124 projecting from a front wall 126 of the body 120, a projection 128 projecting from a back wall 130 of the body 120, and a leg 132 extending downward from the front wall 126 of the body 120. Each projection 124, 128 includes an engagement surface 134, 136 for engaging a corresponding engagement surface 84, 86 of the projections 80 and 82. The projections 124 and 128 are angled upward toward the top of the attachment member 18 such that the engagement surfaces 134, 136 and 84, 86 face one another. The projection 124 on the front wall 126 of the body 120 is at a height below the projection 128 on the back wall 130 of the body 120 corresponding to the height differential of the projections 80 and 82. The body 120 is deflectable during installation to allow the projections 124 and 128 to move past the projections 80 and 82 on the shroud portion 40 for the engagement surfaces 84, 86 and 134, 136 to engage.

The attachment member 18 also includes a projection 140 projecting downward from a bottom of the body, abutment surfaces 142 and 144 on opposite sides of projection 140, and an abutment surface 146 on the bottom of the projection 140. The projection 140 is configured to be received in one of the gaps 34 between adjacent ones of the plurality of circumferentially spaced tabs 32, and in particular the gap 34 below the opening 70 when the handle 14 is positioned. The abutment surfaces 142 and 144 are configured to abut the adjacent tabs 32 that extend into the opening 70 when the handle 14 is positioned and the abutment surface 146 is configured to abut the upwardly extending portion 30.

Figure 20:
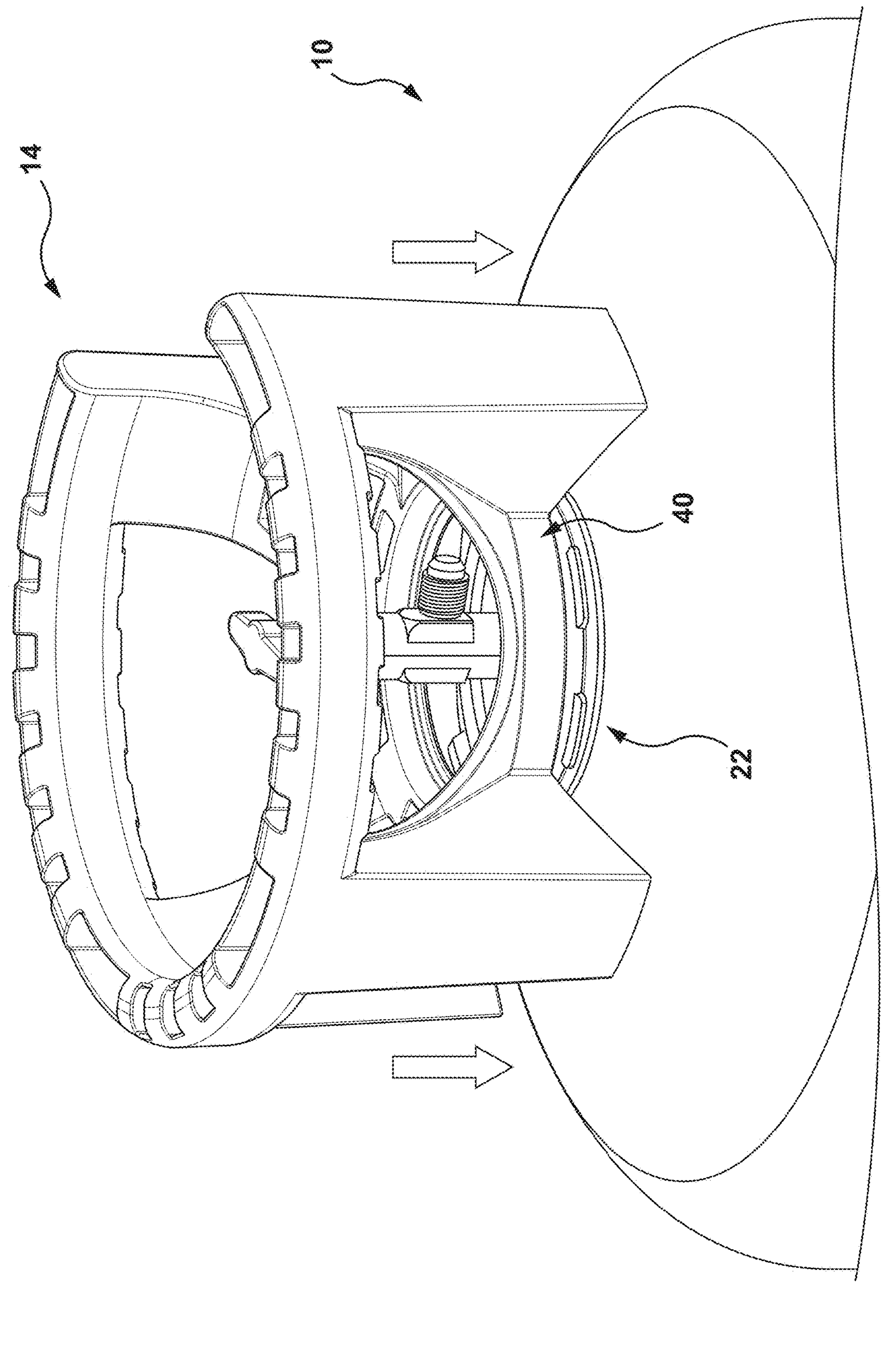
FIG. 20 is a perspective view of the handle being attached to a tank.
Figure 21:
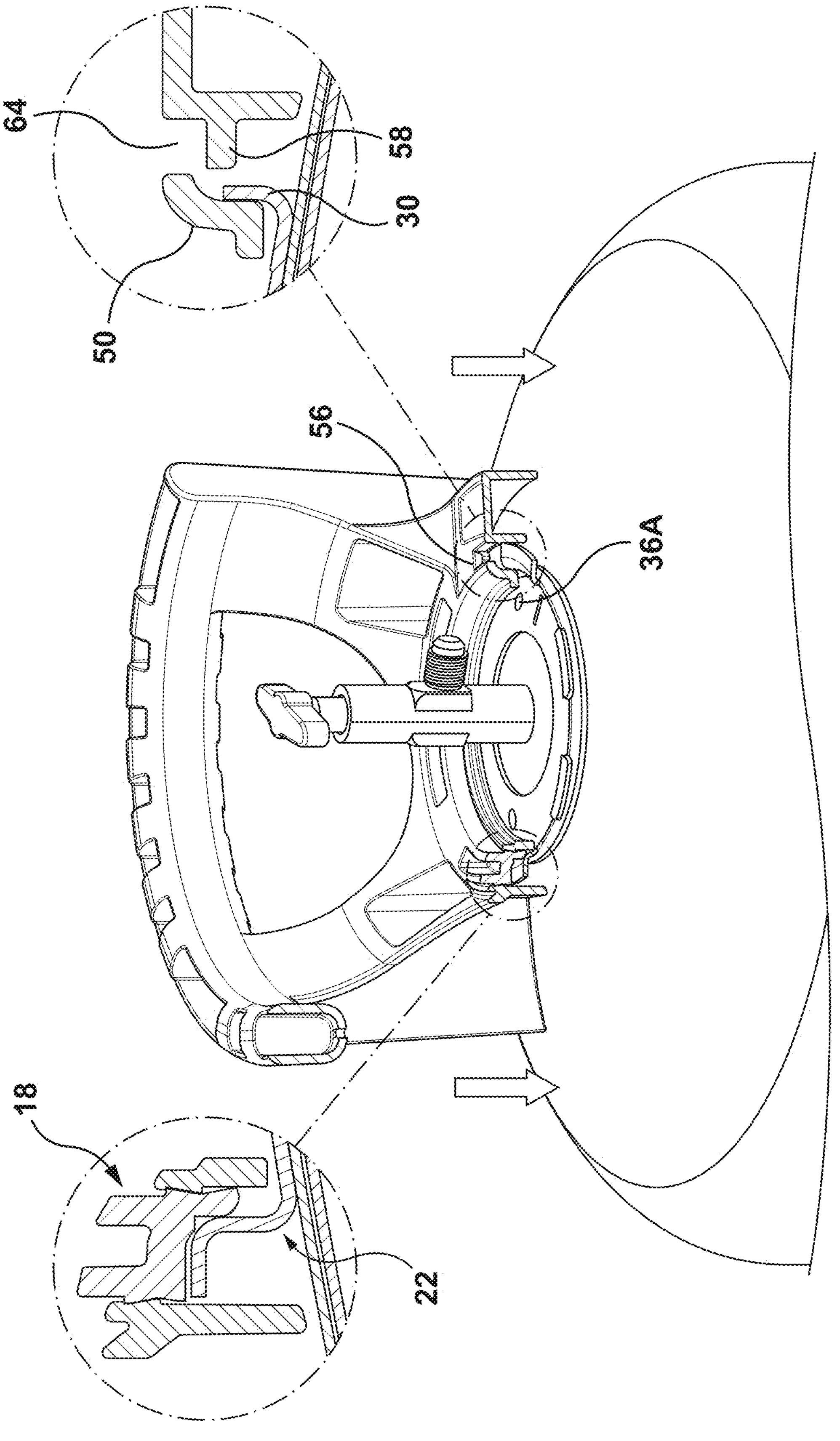
FIG. 21 is another perspective view of the handle being attached to the tank.
Figure 22:
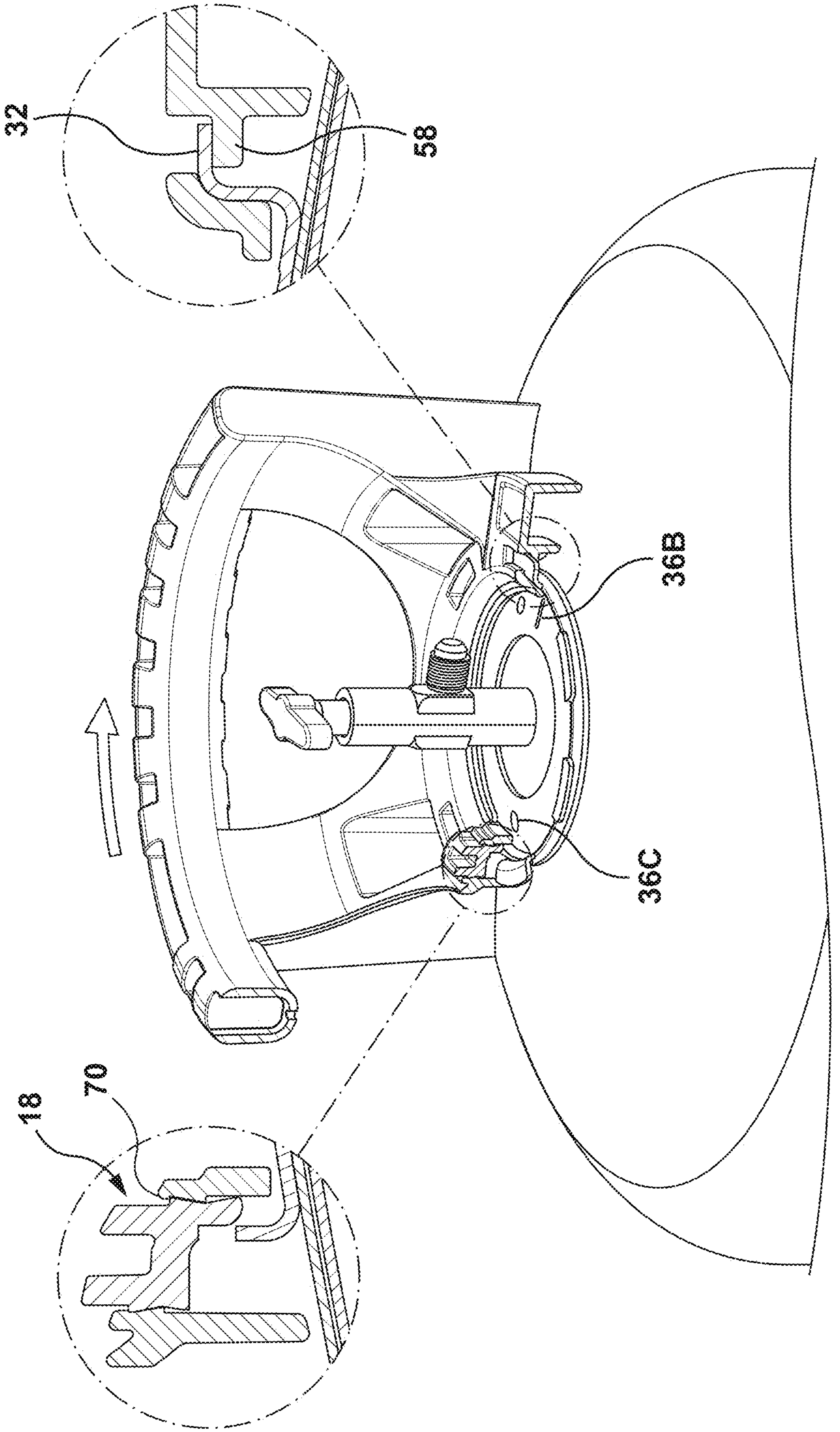
FIG. 22 is still another perspective view of the handle being attached to the tank.
Figure 23:
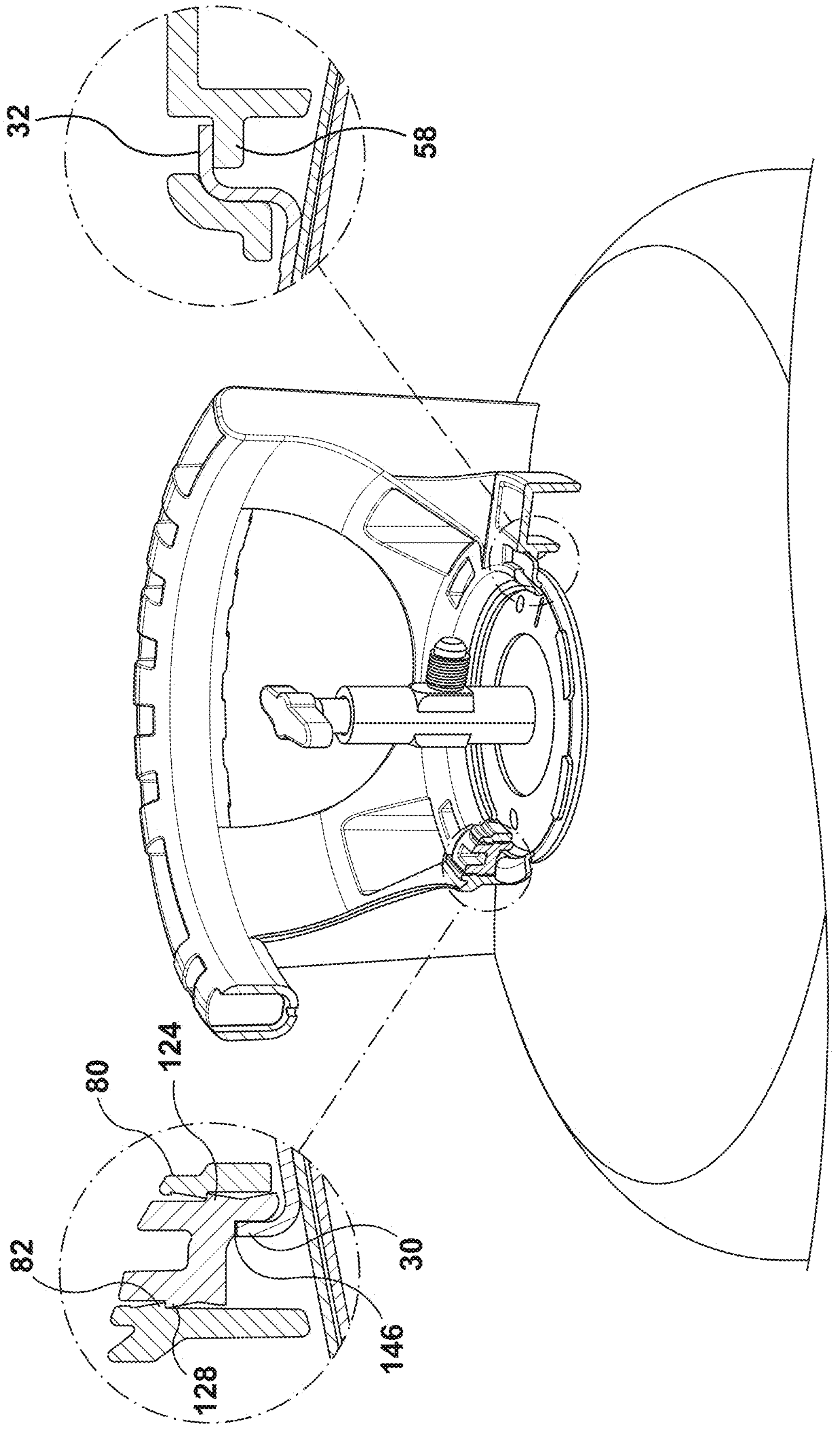
FIG. 23 is yet another perspective view of the handle being attached to the tank.

Turning now to FIGS. 20-24, the attachment of the handle 14 to the tank 12 will be described in detail. FIGS. 21-23 show the handle 14 with portions cutaway and/or portions enlarged to illustrate the attachment of the handle 14 to the tank 12. The handle 14 may be attached to the tank 12 in any suitable manner, for example by a semi-autonomous process or by a fully autonomous process. The handle 14 and tank 12 are designed to be disposable, and as such the handle 14 is attached to the tank 12 in a substantially permanent manner and is removable upon destruction of one of the handle 14 or tank 12.

Referring initially to FIG. 20, to attach the shroud portion 40 to the mounting collar 22, the handle 14 is lowered onto the mounting collar in a downward direction. If not already aligned, the handle 14 can be rotated to align indicia 36*a* on the base with the indicia 38 on the handle such that the plurality of circumferentially spaced ledges 58 are aligned with the respective gaps 34.

Referring now to FIG. 21, as the handle 14 is further lowered, the outer surface of the inner body portion 50 and base 56 of the shroud portion 40 contact the top of the upwardly extending portion 30 preventing further downward movement of the handle 14. In this position, the plurality of circumferentially spaced ledges 58 pass through the respective gaps 34 and move below the plurality of circumferentially spaced tabs 32 and the attachment member 18 is above one of the circumferentially spaced tabs 32. As shown the attachment member 18 is in a first position engaged within the opening 70, although it will be appreciated that the handle 14 may be attached to the tank 12 and then the attachment member 18 attached to the handle 14.

Referring now to FIG. 22, the handle 14 is then rotated relative to the tank 12, for example by about twenty-seven degrees. During rotation, the plurality of circumferentially spaced ledges 58 move under a respective one of the plurality of circumferentially spaced tabs 32. The handle 14 is rotated until the indicia 38 is aligned with the indicia 36*b*, at which point the blocking portions 66 abut sides of respective circumferentially spaced tabs 32 to prevent further rotation and the indicia 36*c* is aligned with the opening 70 such that the opening is above the gap 34 aligned with the indicia 36*c*. In this position each of the plurality of circumferentially spaced ledges 58 is positioned beneath a respective one of the plurality of circumferentially spaced tabs 32, with the plurality of circumferentially spaced tabs 32 being visible through the plurality of openings 64. The interaction between the circumferentially spaced ledges 58 and the plurality of circumferentially spaced tabs 32 prevents upward movement of the handle 14 relative to the mounting collar 22, and the interaction between the base 56 of the shroud portion 40 and the upwardly extending portion 30 prevents further downward movement of the handle 14 relative to the mounting collar.

Figure 24:
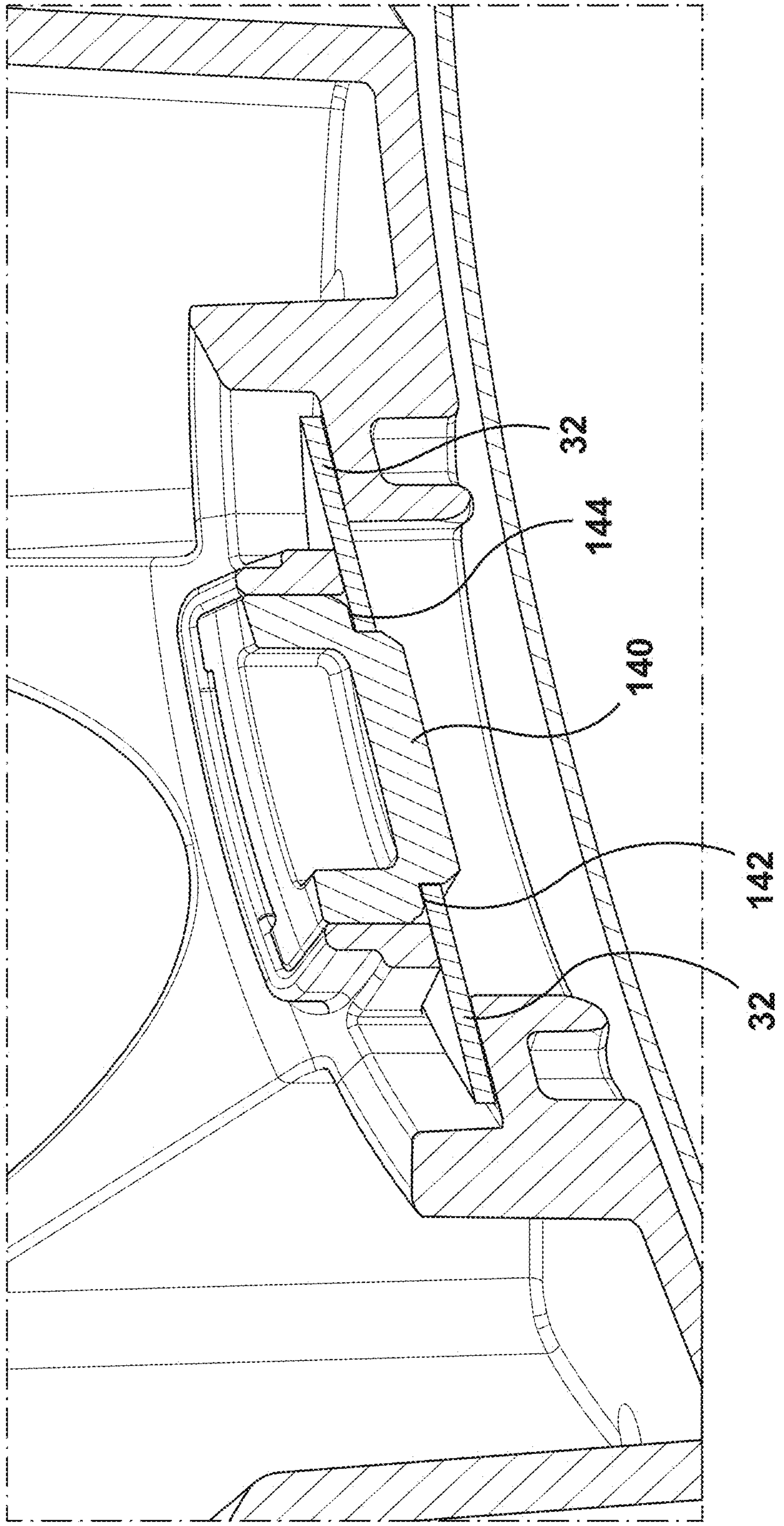
FIG. 24 is a partial cross-sectional view of the handle attached to the tank.

Turning now to FIGS. 23 and 24, to secure the handle 14 to the tank 12, the attachment member 18 is moved from the first position shown in FIG. 22 to the second position shown in FIG. 23. As the attachment member 18 is moved downward, the body 120 deflects to allow the projections 124 and 128 on the attachment member 18 to move below the projections 80 and 82 that project inward from the opening 70 until the abutment surface 146 abuts the upwardly extending portion 30 and the abutment surfaces 142 and 144 abut the adjacent tabs 32 that extend into the opening 70 as best shown in FIG. 24. The projection 140 will be positioned between adjacent tabs 32 in the gap 34 preventing rotation of the handle 14 relative to the tank 12. Once positioned, the engagement surfaces 134 and 136 will engage the corresponding engagement surfaces 84 and 86 to secure the handle 14 to the tank 12 and prevent removal of the handle 14, and the leg 132 will extend between the upwardly extending portion 30 and the front wall 72 of the opening 70. The attachment member 18 may be moved downward by a tool or the like being inserted into the cavity 122 and pressed against the portion of the body 120 forming the bottom of the cavity 122.

The aforementioned systems, components, (e.g., cylinders, tanks, handles, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A handle assembly for a cylinder comprising:

a handle having a shroud portion configured to couple to a collar of the cylinder and a handle portion extending from the shroud portion; and an attachment member configured to be coupled to the shroud portion to prevent rotational movement of the handle relative to the collar, the attachment member having a body, a first projection projecting from a front wall of the body for engaging the shroud portion, and a second projection projecting from a back wall of the body for engaging the shroud portion.

2. The handle assembly according to claim 1, wherein the shroud portion includes a plurality of circumferentially spaced ledges for abutting an underside of a respective one of a plurality of circumferentially spaced tabs of the collar.

3. The handle assembly according to claim 2, wherein the shroud portion additionally includes an opening for receiving the attachment member.

4. The handle assembly according to claim 3, wherein the opening has a front wall, a back wall, a pair of side walls, a third projection projecting inward from the front wall for engaging the first projection, and a fourth projection projecting inward from the back wall for engaging the second projection.

5. The handle assembly according to claim 4, wherein the first and second projections are angled upward such that respective engagement surfaces of the first and second projections face toward a base of the shroud portion, and wherein the third and fourth projections are angled downward such that respective engagement surfaces of the third and fourth projections face away from the base allowing the engagement surfaces of the first and second projections to engage the engagement surfaces of the third and fourth projections.

6. The handle assembly according to claim 4, wherein the front wall has a circumferential width less than a circumferential width of the back wall.

7. The handle assembly according to claim 4, wherein the body is deflectable during installation to allow the first and second projections to be positioned below the third and fourth projections.

8. The handle assembly according to claim 1, wherein the first projection is at a height below the second projection.

9. The handle assembly according to claim 1, wherein the handle portion has a plurality of circumferentially spaced pillars extending from the shroud portion and a curved handle extending above the pillars.

10. A portable cylinder comprising:

a tank having an upper portion having a valve port;

a mounting collar coupled to the upper portion of the tank, the mounting collar having an upwardly extending portion surrounding the valve port and a plurality of circumferentially spaced tabs extending radially outwardly from the upwardly extending portion, wherein a respective gap is formed between adjacent ones of the plurality of circumferentially spaced tabs; and a handle assembly attached to the mounting collar, the handle assembly comprising:

a handle having a shroud portion coupled to the collar and a handle portion extending from the shroud portion; and an attachment member coupled to the shroud portion to prevent rotational movement of the handle relative to collar, the attachment member having a body, a first projection projecting from a front wall of the body for engaging the shroud portion, and a second projection projecting from a back wall of the body for engaging the shroud portion.

11. The portable cylinder according to claim 10, wherein the shroud portion includes a plurality of circumferentially spaced ledges for abutting an underside of a respective one of a plurality of circumferentially spaced tabs of the collar.

12. The portable cylinder according to claim 11, wherein the shroud portion additionally includes an opening for receiving the attachment member, the opening having a front wall, a back wall, a pair of side walls, a third projection projecting inward from the front wall for engaging the first projection, and a fourth projection projecting inward from the back wall for engaging the second projection.

13. The portable cylinder according to claim 12, wherein the first and second projections are angled upward such that respective engagement surfaces of the first and second projections face toward a base of the shroud portion, and wherein the third and fourth projections are angled downward such that respective engagement surfaces of the third and fourth projections face away from the base allowing the engagement surfaces of the first and second projections to engage the engagement surfaces of the third and fourth projections.

14. The portable cylinder according to claim 12, wherein the attachment member additionally includes a projection projecting downward from a bottom of the body and abutment surfaces and on opposite sides of projection, wherein the projection is received in one of the gaps between adjacent ones of the plurality of circumferentially spaced tabs below the opening and the abutment surfaces abut the adjacent tabs.

15. The portable cylinder according to claim 12, wherein the body is deflectable during installation to allow the first and second projections to be positioned below the third and fourth projections.

16. A handle assembly for a cylinder comprising:

a handle having a shroud portion configured to couple to a collar of the cylinder, the shroud portion including a plurality of circumferentially spaced ledges for abutting an underside of a respective one of a plurality of circumferentially spaced tabs of the collar, a handle portion extending from the shroud portion, and an opening having a front wall, a back wall, a pair of side walls, and at least one projection projecting inward from one of the walls; and an attachment member configured to be coupled to the shroud portion to prevent rotational movement of the handle relative to the collar, the attachment member having a body and at least one projection projecting from a wall of the body for engaging the at least one projection of the shroud portion.

17. The handle assembly according to claim 16, wherein the at least one projection of the attachment member includes a first projection projecting from a front wall of the body for engaging the shroud portion, and a second projection projecting from a back wall of the body for engaging the shroud portion.

18. The handle assembly according to claim 17, wherein the at least one projection of the shroud portion includes a third projection projecting inward from the front wall for engaging the first projection, and a fourth projection projecting inward from the back wall for engaging the second projection.

19. The handle assembly according to claim 18, wherein the body is deflectable during installation to allow the first and second projections to be positioned below the third and fourth projections.

* * * * *